US012581012B2

(12) United States Patent
Zaifuddin

(10) Patent No.: US 12,581,012 B2
(45) Date of Patent: Mar. 17, 2026

(54) UNIQUE CALL PROGRESS TONE INVOCATION TIMER PER CLIENT OR ACCESS TYPE

(71) Applicant: T-MOBILE USA, INC., Bellevue, WA (US)

(72) Inventor: Sabuhi Kiran Zaifuddin, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 700 days.

(21) Appl. No.: 17/960,069

(22) Filed: Oct. 4, 2022

(65) Prior Publication Data

US 2024/0114089 A1     Apr. 4, 2024

(51) Int. Cl.
| | |
|---|---|
| *H04M 1/82* | (2006.01) |
| *H04L 65/1016* | (2022.01) |
| *H04L 65/1023* | (2022.01) |
| *H04L 65/1046* | (2022.01) |

(52) U.S. Cl.
CPC .......... *H04M 1/82* (2013.01); *H04L 65/1016* (2013.01); *H04L 65/103* (2013.01); *H04L 65/1046* (2013.01)

(58) Field of Classification Search
CPC ........ H04M 1/82; H04M 1/2535; H04M 1/56; H04M 2250/06; H04L 65/1016; H04L 65/103; H04L 65/1046
See application file for complete search history.

(56) References Cited

U.S. PATENT DOCUMENTS

| | | | | |
|---|---|---|---|---|
| 3,612,767 | A | * 10/1971 | Anderson | H04N 7/147 |
| | | | | 348/14.11 |
| 8,989,179 | B2 * | 3/2015 | Buckley | H04L 12/66 |
| | | | | 370/353 |
| 9,191,265 | B1 * | 11/2015 | McGinn | H04L 65/1083 |
| 9,736,307 | B1 * | 8/2017 | Noble, Jr. | H04L 65/1069 |
| 9,942,402 | B1 * | 4/2018 | Noble, Jr. | H04M 3/02 |
| 10,305,657 | B2 * | 5/2019 | Kaul | H04W 4/90 |
| 10,313,847 | B2 * | 6/2019 | Lau | H04M 7/006 |
| 10,798,134 | B2 * | 10/2020 | Sinha | H04L 65/1104 |
| 11,388,292 | B2 * | 7/2022 | Antunes | H04M 7/006 |
| 11,621,981 | B2 * | 4/2023 | Yuan | H04L 65/1063 |
| | | | | 370/352 |
| 2007/0211694 | A1 * | 9/2007 | Rasanen | H04L 45/00 |
| | | | | 370/352 |
| 2007/0258477 | A1 * | 11/2007 | Huh | H04L 65/1096 |
| | | | | 370/328 |
| 2008/0109853 | A1 * | 5/2008 | Einarsson | H04L 65/65 |
| | | | | 348/E7.071 |
| 2011/0090848 | A1 * | 4/2011 | Kim | H04W 60/00 |
| | | | | 370/328 |
| 2012/0213152 | A1 * | 8/2012 | Hegarty | H04L 65/1095 |
| | | | | 370/328 |
| 2015/0071169 | A1 * | 3/2015 | Wang | H04W 8/02 |
| | | | | 370/328 |

(Continued)

*Primary Examiner* — Lisa Hashem
(74) *Attorney, Agent, or Firm* — Lee & Hayes, P.C.

(57) ABSTRACT

Aspects of the invention add information in the call initiation stage so that a client or device type and access type data may be embedded in the call request. Therefore, during the call-progress tone (Call Progress Tone), a processing server may then provide a logic to handle the different access type and/or client type to further enhance user experience.

20 Claims, 7 Drawing Sheets

IDENTIFYING A CALL REQUEST FROM A FIRST PARTY TO A SECOND PARTY — 402

GENERATING A FIRST TAG IDENTIFYING THE FIRST PARTY BASED ON A FIRST CLIENT TYPE — 404

GENERATING A SECOND TAG IDENTIFYING THE SECOND PARTY BASED ON A SECOND CLIENT TYPE — 406

ACCESSING A DATABASE FOR ONE OR MORE TIMER CONFIGURATIONS — 408

GENERATING A FIRST TAG IDENTIFYING THE FIRST PARTY BASED ON A CLIENT TYPE — 410

IN RESPONSE TO AN EXPIRATION OF THE TIMER CONFIGURATION, IDENTIFYING A CONFIGURED RESPONSE CORRESPONDING TO THE FIRST CLIENT TYPE OR THE SECOND CLIENT TYPE — 412

PROVIDING AN INDICIA TO THE FIRST PARTY AS A FUNCTION OF THE CONFIGURED RESPONSE BEFORE THE TIME EXPIRES — 414

(56) References Cited

U.S. PATENT DOCUMENTS

| | | | | |
|---|---|---|---|---|
| 2015/0080035 A1* | 3/2015 | Tanaka | .................... | H04W 4/14 |
| | | | | 455/466 |
| 2019/0312699 A1* | 10/2019 | Kaul | ........................ | H04W 4/90 |
| 2024/0114089 A1* | 4/2024 | Zaifuddin | .............. | H04M 1/82 |

* cited by examiner

FIG. 2A

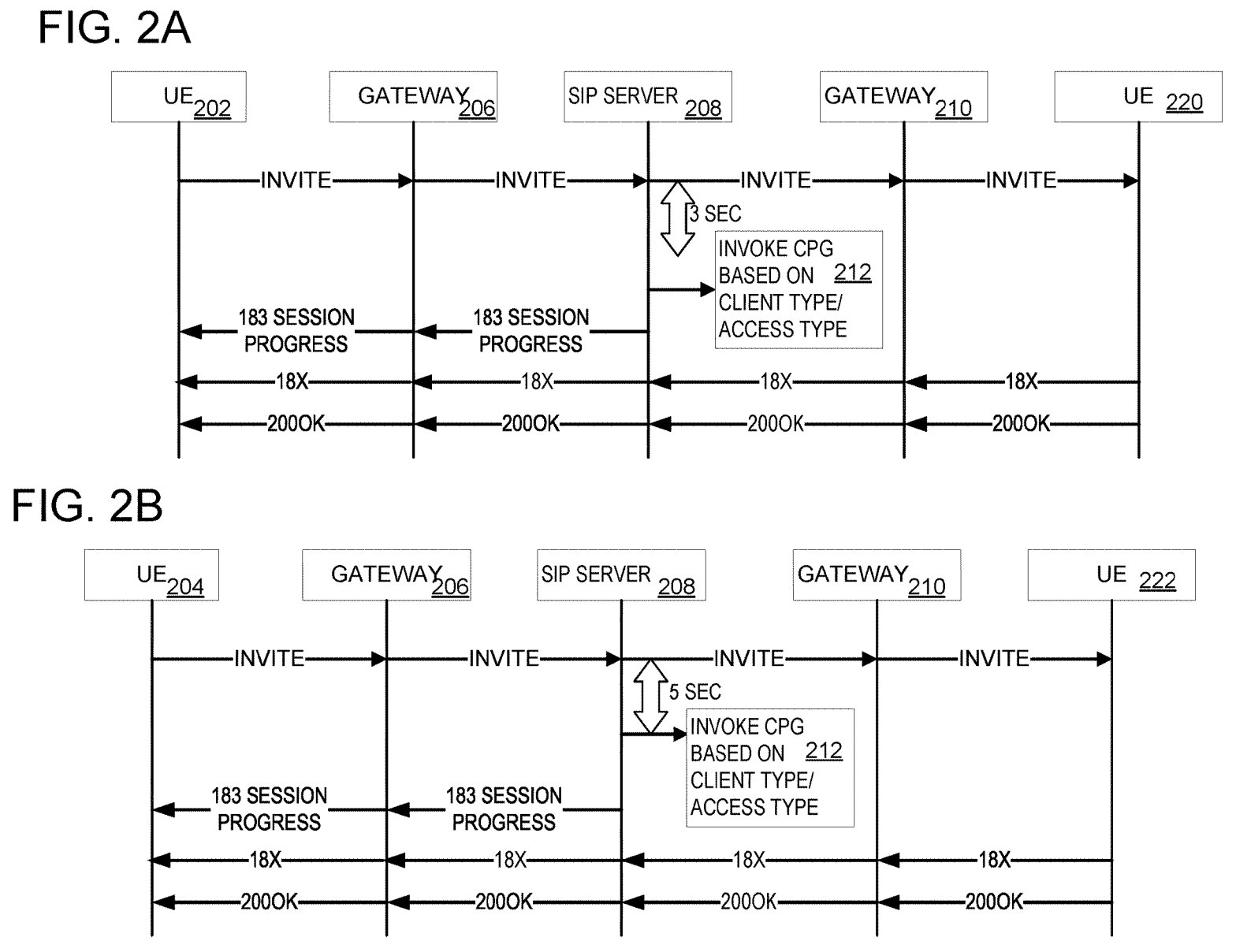

UE 220
GATEWAY 210
SIP SERVER 208
GATEWAY 206
UE 202

INVITE
INVITE
INVITE
INVITE

3 SEC

INVOKE CPG
BASED ON 212
CLIENT TYPE/
ACCESS TYPE

183 SESSION PROGRESS
183 SESSION PROGRESS
183 SESSION PROGRESS 18X
18X
18X
18X

UE 222
GATEWAY 210
SIP SERVER 208
GATEWAY 206
UE 204

INVITE
INVITE
INVITE
INVITE

5 SEC

INVOKE CPG
BASED ON 212
CLIENT TYPE/
ACCESS TYPE

183 SESSION PROGRESS
183 SESSION PROGRESS
183 SESSION PROGRESS 18X
18X
18X
18X

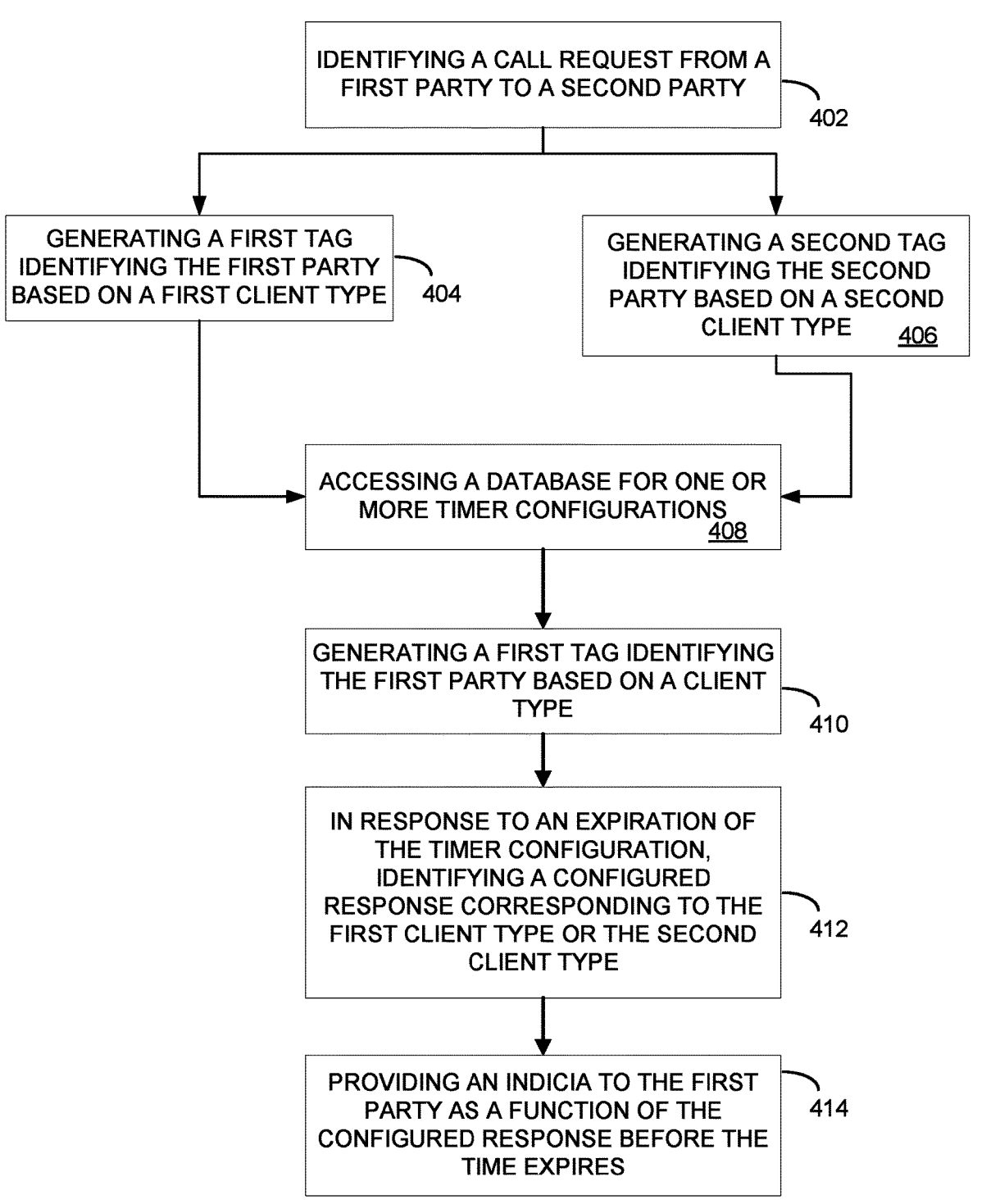

IDENTIFYING A CALL REQUEST FROM A FIRST PARTY TO A SECOND PARTY — 402

GENERATING A FIRST TAG IDENTIFYING THE FIRST PARTY BASED ON A FIRST CLIENT TYPE — 404

GENERATING A SECOND TAG IDENTIFYING THE SECOND PARTY BASED ON A SECOND CLIENT TYPE — 406

ACCESSING A DATABASE FOR ONE OR MORE TIMER CONFIGURATIONS — 408

GENERATING A FIRST TAG IDENTIFYING THE FIRST PARTY BASED ON A CLIENT TYPE — 410

IN RESPONSE TO AN EXPIRATION OF THE TIMER CONFIGURATION, IDENTIFYING A CONFIGURED RESPONSE CORRESPONDING TO THE FIRST CLIENT TYPE OR THE SECOND CLIENT TYPE — 412

PROVIDING AN INDICIA TO THE FIRST PARTY AS A FUNCTION OF THE CONFIGURED RESPONSE BEFORE THE TIME EXPIRES — 414

UNIQUE CALL PROGRESS TONE INVOCATION TIMER PER CLIENT OR ACCESS TYPE

TECHNICAL FIELD

Embodiments discussed herein generally relate to enhanced call progress (CPG) tone.

BACKGROUND

One of the most fundamental functions of a smartphone is the ability to make a voice call. Whether the call was made via a mobile network or via an application Over-The-Top (OTT), such as using a telephony application server (TAS), the call needs to be established. Before the call is established, a call progress (CPG) tone is used to not only allowing the caller to know that the call establishment is in progress, but also allowing the TAS to register the call with a delay.

In general, ringing is controlled via two Informational Responses in session initiation protocol (SIP): the 183 Session Progress and the 180 Ringing.

The main difference between them, is the 180 Ringing message instructs the UA to create the dial-tone locally and mostly does not contain a session description protocol (SDP) body, whereas the 183 Session Progress contains a session description protocol (SDP) and headers, which allows to convey more details about the call progress. Also, 183 Session Progress allows for regional ring-back and carrier announcements.

In some network implementations, especially where Voice over LTE is involved on the originating side, 183 Session Progress is needed to negotiate SDP.

Meanwhile, in certain calls established towards OTT or web client, where this terminating call is enabled via Web Real-Time Communications (WebRTC), the WebRTC Gateway has challenges in sending 183 Session Progress for INVITE (as collecting Interactive Connectivity Establishment (ICE) candidates may take some time) and thus it sends 180 Ringing directly. SDP negotiation is then done via 200 OK to INVITE.

As a result, the TAS must connect to media resource function (MRF) to generate a dummy 183 via Call Progress Tone so that the originating side could setup up dedicated bearer successfully later.

Since WebRTC Gateway has evolved over time, in some applications, it can now support 183 session progress for the OTT clients only. Certain WebRTC clients (for example: browser-based clients) may keep using the same flow (i.e. 180 Ringing response for INVITE and TAS using Call Progress tone to generate temporary 183).

However, a limitation exists with an existing Telephony Application Server, where one global timer controls the initiation of Call Progress tone for use cases where 183 Session Progress response is not received for INVITE. For example, TAS serving the terminating OTT will invoke Call Progress tone after 5 seconds of sending an INVITE out. This timer cannot be adjusted separately for call towards web-based clients or VOLTE clients.

In yet another situation, another limitation exists where the Call Progress tone is configured to be invoked for clients that establish with a unique feature tag. There are no flexibilities to configure unique Call Progress Tones for different client types or based on different access type, for example, 5G, LTE, WiFi, CS.

Therefore, improvements to overcome such shortcomings are needed through technical systems and methods.

SUMMARY

Aspects of the invention provide flexibility and enhancement in control of the Call Progress tone invocation by enabling and enhancing the Call Progress Tone timer to support different values for different client types and network access types. In one embodiment, for example, descriptions or identifiers that differentiates different clients, such as a regular voice over LTE (VOLTE) client with an "IMEI sip.instance"; a regular non-SIM clients, such as watches and tablets—"UUID sip.instance"; a DIGITS OTT client, or a DIGITS Web client, may be used as part of the SIP headers. In a further embodiment, a new feature tag may be generated to distinguish Call Progress Tone timer setting per client type or using Access Class.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 2A and 2B are diagrams illustrating a system having multiple Call Progress Tone invocation timers on an application server and a system flow structure for an enhanced Call Progress Tone according to one embodiment.

FIG. 4 is a flow chart illustrating a method for a system having multiple Call Progress Tone invocation timers on application server according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
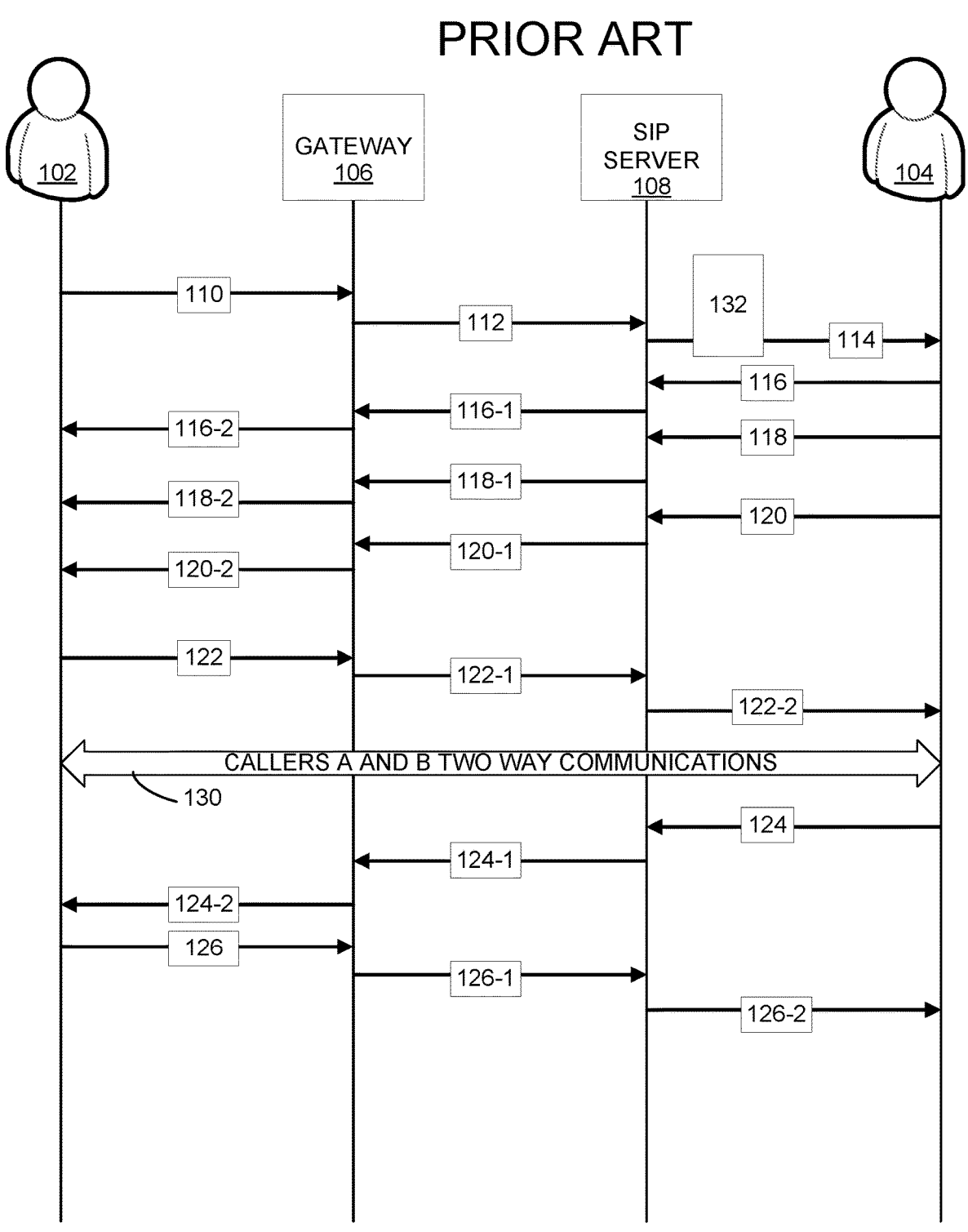
FIG. 1 is a diagram illustrating an existing approach of having a Call Progress Tone enabled in a SIP call.

Referring to FIG. 1, a prior art illustration of an existing approach of Call Progress Tone invocation during call setup may be shown. As an initial setup, a caller 102, such as a caller A, may wish to call a callee 104, such as a callee B established via the OTT, web client or any other user equipment. In order to achieve this goal, the caller 102 may initiate an invite 110 to a gateway 106, such as a PCSCF, or the like. The gateway 106 further may send 112 the invite to a SIP application server 108 before the invite 114 reaches the target callee 104.

Before the callee 104 may receive the invite and respond, aspects of the existing system and method may initiate a timer at 132 waiting for a SDP response before it may invoke Call Progress Tone. In one example, the timer may be 5 seconds or a predetermined amount of time. The timer length may be determined by an authority, by an algorithm or may be adjusted using machine learning to study past performance to improve future performance. For example, the call receiver may have an impact on the appropriate length of the call timer.

The callee 104 may respond by sending a series of responses, such as a 100 trying message 116, a 180 ringing message 118, and a 200 OK message 120.

In turn, the SIP server 108 and the gateway 106 may relay the messages from the callee 104 to the caller 102, such as messages 116-1, 116-2, 118-1, 118-2, 120-1 and 120-2.

The caller 102 may accept and send the acknowledgment messages 122, 122-1 and 122-2 to the callee 104 before caller 102 and callee 104 begin the conversation in 130. To end the conversation, then there may be a series terminating messages (e.g., bye message) 124, 124-1, and 124-2 and 200 OK messages (messages 126, 126-1, and 126-2).

Figure 5:
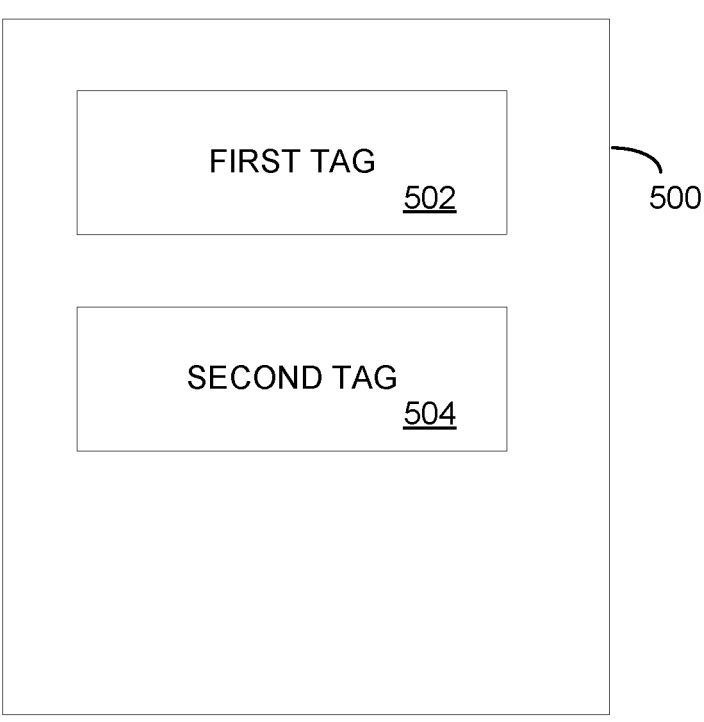
FIG. 5 is a diagram showing a tag structure for an enhanced Call Progress Tone according to one embodiment.

Referring now to FIG. 2A and FIG. 2B, according to embodiments of the invention, a client type of the UE may be associated with a callee 202 may be identified by a first tag 502 of a tag structure 500 in FIG. 5. For example, the client type tag information may associate one or more of the following: a voice over LTE (VOLTE) device, an over-the-top (OTT) device, or a non-subscriber identifier module (SIM) device, as shown in Table 1 below:

| S.N. | Registration Access Type | Registration Client Type | Timer in Seconds |
|------|--------------------------|--------------------------|------------------|
| 1. | WiFi 802.11 | Client Type xx. | a |
| 2. | UTRAN | Client Type yy | b |
| 3. | E-UTRAN | User-Agent zz | c |
| 4. | WiFi 802.11 | User Agent yy | a |
| 5. | Roaming Network | Client Type xx. | d |

It is to be understood that other client type may be used without departing from the scope and spirit of the invention. The first tag 502 may be set by an authority.

In yet another embodiment, a SIP server (e.g., an application server) 208 in FIG. 2 may serve to terminate or call a party. In one aspect, the UE 202 sends an invite to a gateway 206, to the SIP server 208, to a gateway 210 before to a UE 220 (a callee). In one aspect, the SIP server 208 may maintain a database of one or more timer configurations. In one embodiment, the one or more time configurations may correspond to one or more client type and access type according to aspects of the invention. In differing from the prior approach, the callee UE 220 is registered as a specific client type, such as client-type xx in Access Type 1. As the client type and access type information is received by the SIP server 208, the SIP server 208 may trigger a timer according to an identification of the caller UE 202 or the callee UE 220 based on the client type or access type at 212, as illustrated in FIG. 2A and FIG. 2B. In one aspect, the server 208 may also establish the callee B 204 with a second tag 504. Logically, the first tag 502 and the second tag 504 may take on a variety of forms and types as long as all parties to the call recognize and understand the meaning of the first tag 502 and second tag 504 such as when the first tag 502 and second tag 504 follow a known protocol or data structure.

In one embodiment, the SIP Server 208 may be a TAS. In one embodiment, the SIP server 208 may initiate the timer and upon expiry may trigger Call Progress (CPG) Tone based on device type or access type. In one example, the SIP server 208 may provide the Call Progress Tone with a recorded message. In another example, the IMS may retrieve the recorded message from a database. As shown in FIG. 2A, the timer is 3 seconds.

As such, aspects of the invention improve over the prior systems because the prior systems fail to apply timer of unique/discrete length based on any access type or client type identifications, for triggering Call Progress Tone during call setup.

The Call Progress Tone timers may be adjusted in a variety of ways. In one embodiment, an authority may adjust the tailoring. In another embodiment, an algorithm or machine learning may be used to review past tailoring and adjust the tailoring to result in better call performance going forward. As a result, by adjusting the timer uniquely per client type and/or access type, the call performance may be improved from a "one size fits all" type of approach to a more tailored approach.

In one embodiment, it is to be understood that the UEs 202 and 204 may be a portable computing device 801.

In another embodiment, according to FIG. 2B, the timer may be 5 seconds based on the client type and the access type. In this example, the client type for UE 222 may be client-type yy in access type 2 or access type 4. In another embodiment, upon expiration of the timer configuration or timer, an indicia is provided to the caller UE 204 or UE 202. The indicia may be a ringtone or other kind of message.

Figure 3:
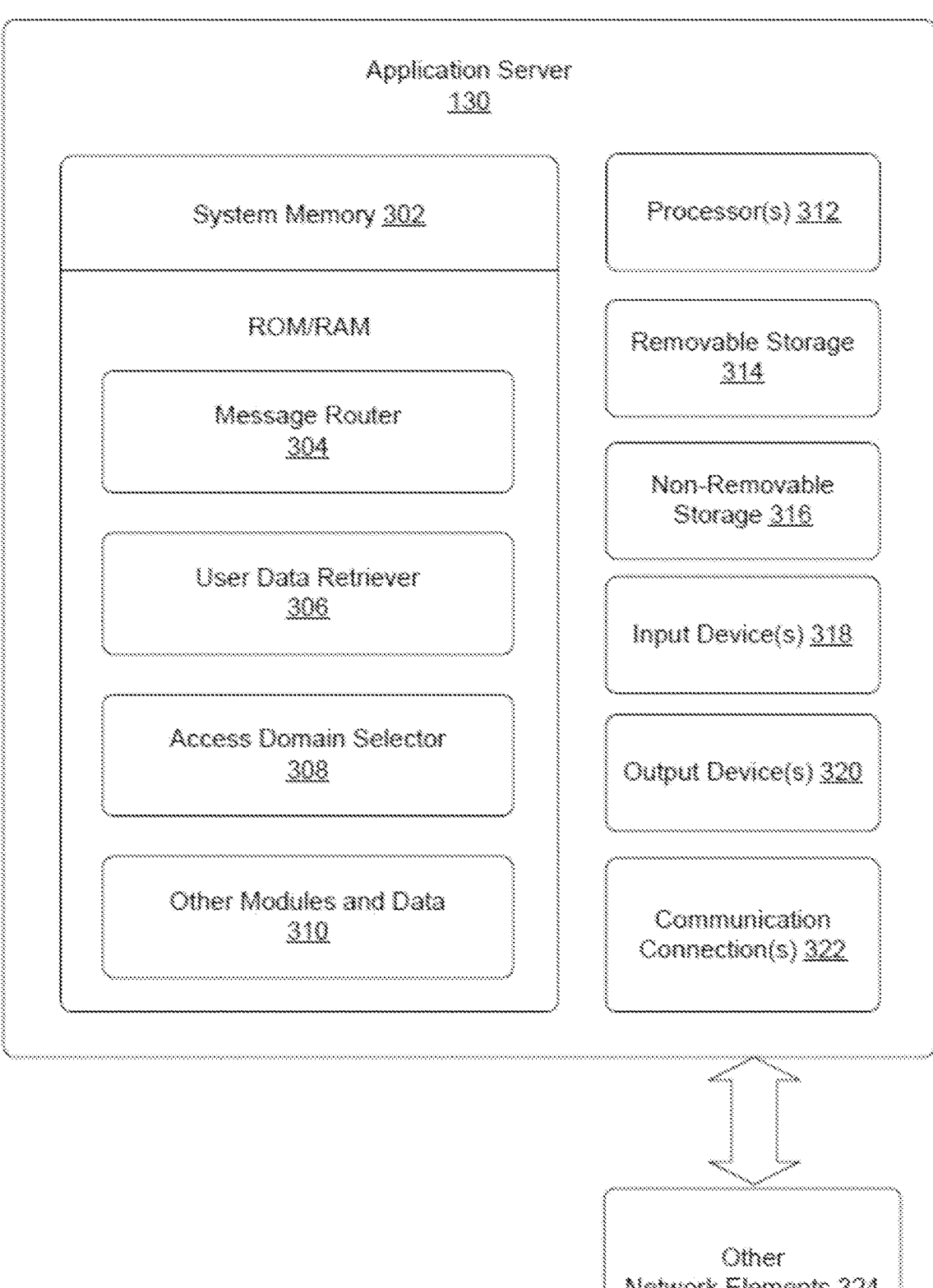
FIG. 3 is a diagram illustrating an example system architecture for an application server according to one embodiment.

FIG. 3 depicts an example system architecture for an application server 130 according to one embodiment. In one embodiment, the application server 130 may be the application server 208 of FIG. 2A or FIG. 2B. An application server 130 may have a system memory 302 that stores data for the application server 130, including a message router 304, a user data retriever 306, an access domain selector 308, and/or other modules and data 310. As discussed above, an application server 130 may be a TAS and/or a SCC-AS. For example, the application server 130 may be a TAS, but one or more elements shown in FIG. 3, such as a user data retriever 306 and/or an access domain selector 308, may be considered to be an SCC-AS. In other examples, some elements of the application server 130 shown in FIG. 3 may be duplicated and/or distributed among different application servers 130, such as a TAS and a separate SCC-AS.

In various examples, system memory 302 may be volatile (such as RAM), non-volatile (such as ROM, flash memory, etc.), or some combination of the two. Example system memory 302 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The message router 304 can receive a terminating call invite 132 for a terminating UE 102, and route, or cause other network elements to route, the terminating call invite 132 toward the terminating UE 102. The message router 304 can route, or cause other network elements to route, a terminating call invite 132 towards a terminating UE 102 over a CS-domain RAN 106 or a PS-domain RAN 108. The message router 304 can also, upon a failed attempt to route a terminating call invite 132 to a terminating UE 102 over a PS-domain RAN 108, perform one or more retries to route the terminating call invite 132 to the terminating UE 102 according to either a CS retry option 134 or a PS retry option 136 that has been enabled by the access domain selector 308.

The user data retriever 306 can obtain user data associated with a UE 102 from an HSS 118. For example, the user data retriever 306 can use the Diameter protocol to send UDR messages 202 to an HSS 118 to request T-ADS information 210, CS-domain location information 124, a CS-domain age value 128, PS-domain location information 122, and/or a PS-domain age value 126 associated with a terminating UE 102, and can receive the requested data in UDA messages 206 from the HSS 118.

The access domain selector 308 can use user data associated with a terminating UE 102 to determine whether to initially attempt to route a terminating call invite 132 to the terminating UE 102 via a CS-domain RAN 106 or a PS-domain RAN 108, and can enable either a CS retry option 134 or a PS retry option 136 that the message router 304 can follow if an initial attempt to route the terminating call invite 132 to the terminating UE 102 via the PS-domain RAN 108 fails.

The access domain selector 308 can select to enable the PS retry option 136 if T-ADS information 210 indicates that the terminating UE 102 was connected to a 5G NG-RAN, if T-ADS information 210 indicates that the terminating UE 102 was connected to an LTE E-UTRAN and a CS-domain age value 128 for CS-domain location information 124 is equal to or greater than a threshold age value, if queries for T-ADS information 210 have been disabled, if the application server 130 determines that the UE 102 is connected via a Wi-Fi access network or an unknown access network and a parameter setting indicates that the PS retry option 136 is to be used in that situation, and/or if certain Diameter protocol errors occur when the user data retriever 306 attempts to request user data from an HSS 118.

The access domain selector 308 can instead select to enable the CS retry option 134 if T-ADS information 210 indicates that the terminating UE 102 was connected to an LTE E-UTRAN and a CS-domain age value 128 for CS-domain location information 124 is less than a threshold age value, or if the application server 130 determines that the UE 102 is connected via a Wi-Fi access network or an unknown access network and a parameter setting indicates that the CS retry option 134 is to be used in that situation.

The access domain selector 308 can also be configured to disable both the CS retry option 134 and PS retry option 136, and/or terminate any attempts to route a terminating call invite 132 to a terminating UE 102 if certain types of Diameter protocol errors occur when the user data retriever 306 attempts to request user data from an HSS 118, such as a 5001 "User Unknown" Diameter error, a 5002 "Identities Don't Match" Diameter error, a 5101 "Operation Not Allowed" Diameter error, or a 5102 "User Data Cannot Be Read" Diameter error.

Additionally, the access domain selector 308 can also be configured to cause an initial attempt to connect an incoming call to a terminating UE 102 via a CS-domain RAN 106 as a CS breakout, instead of via a PS-domain RAN 108 followed by using one of the CS retry option 134 or the PS retry option 136 if needed, when the terminating UE 102 or an associated user is not registered with the IMS 104 or does not have an IMS voice subscription, if the terminating UE 102 already has an active CS-domain session, and/or if T-ADS information 210 retrieved from the HSS 118 indicates that the UE 102 does not support IMS Voice Over PS services or that the UE's support for IMS Voice Over PS services is unknown.

The other modules and data 310 may be utilized by the application server 130 to perform or enable performing any action taken by the application server 130. The other modules and data 310 can include a platform and applications, and data utilized by the platform and applications.

The application server 130 can also include processor(s) 312, removable storage 314, non-removable storage 316, input device(s) 318, output device(s) 320, and/or communication connections 322 for communicating with other network elements 324.

In some embodiments, the processor(s) 312 may be a central processing unit (CPU), a graphics processing unit (GPU), both CPU and GPU, or other processing unit or component known in the art.

The application server 130 can also include additional data storage devices (removable and/or non-removable) such as, for example, magnetic disks, optical disks, or tape. Such additional storage is illustrated in FIG. 3 by removable storage 314 and non-removable storage 316. Computer storage media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by the application server 130. Any such computer-readable storage media may be part of the application server 130. In various examples, any or all of system memory 302, removable storage 314, and non-removable storage 316, store programming instructions which, when executed, implement some or all of the herein-described operations of the application server 130.

In some examples, the application server 130 can also have input device(s) 318, such as a keyboard, a mouse, a touch-sensitive display, voice input device, etc., and/or output device(s) 320 such as a display, speakers, a printer, etc. These devices are well known in the art and need not be discussed at length here.

The application server 130 can also contain communication connections 322 that allow the application server 130 to communicate with other network elements 324, such as an S-CSCF 120 and/or other CSCFs, elements of PS-domain core networks 110 and/or CS-domain core networks 112 connected to CS-domain RANs 106 and/or PS-domain RANs 108, an HSS 118, and/or other network elements.

Referring now to FIG. 4, a flowchart illustrates a method for an enhanced Call Progress Tone according to one embodiment. At 402, a call request from a first party to a second party may be identified. In one embodiment, the call request comprises a call invite signal.

At 404, a first tag identifying the first party based on a first client type may be generated. In another embodiment, at 406, a second tag identifying the second party based on a second client type may be generated. As mentioned previously, the first tag may be set by an authority, by the first party, by an algorithm or by studying past calls and classifying the call using a first tag based on past performance. At 408, based on the identified first client type and the second client type, the SIP server (e.g., SIP server 208) may access a database for one or more timer configurations. In one embodiments, the one or more timer configurations correspond to the first client type or the second client type. For example, a timer configuration of 5 seconds, 10 seconds, 30 seconds, or the like may be associated with the first client type or the second client type. Logically, the timer may be adjusted by an administrator or by an algorithm or by machine learning to create a timer configuration or length that results in desired call characteristics and performance.

At 410, a timer configuration may be configured as a function of the accessing. At 412, in response to an expiration of the timer configuration, identifying a configured response corresponding to the first client type or the second client type. In another embodiment, a configured response may be identified at 408 corresponding to the client type before the timer expires. The configure response may follow a shared protocol or a data structure such that the configured response may be easily and efficiently be understood and be communicated.

At 414, an indicia or information may be provided or issued to the first party 104 or the device associated with the first party as a function of the configured response before the time expires. The indicia may follow a shared protocol or a data structure such that the indicia may be easily and efficiently be understood and be communicated.

Figure 6:
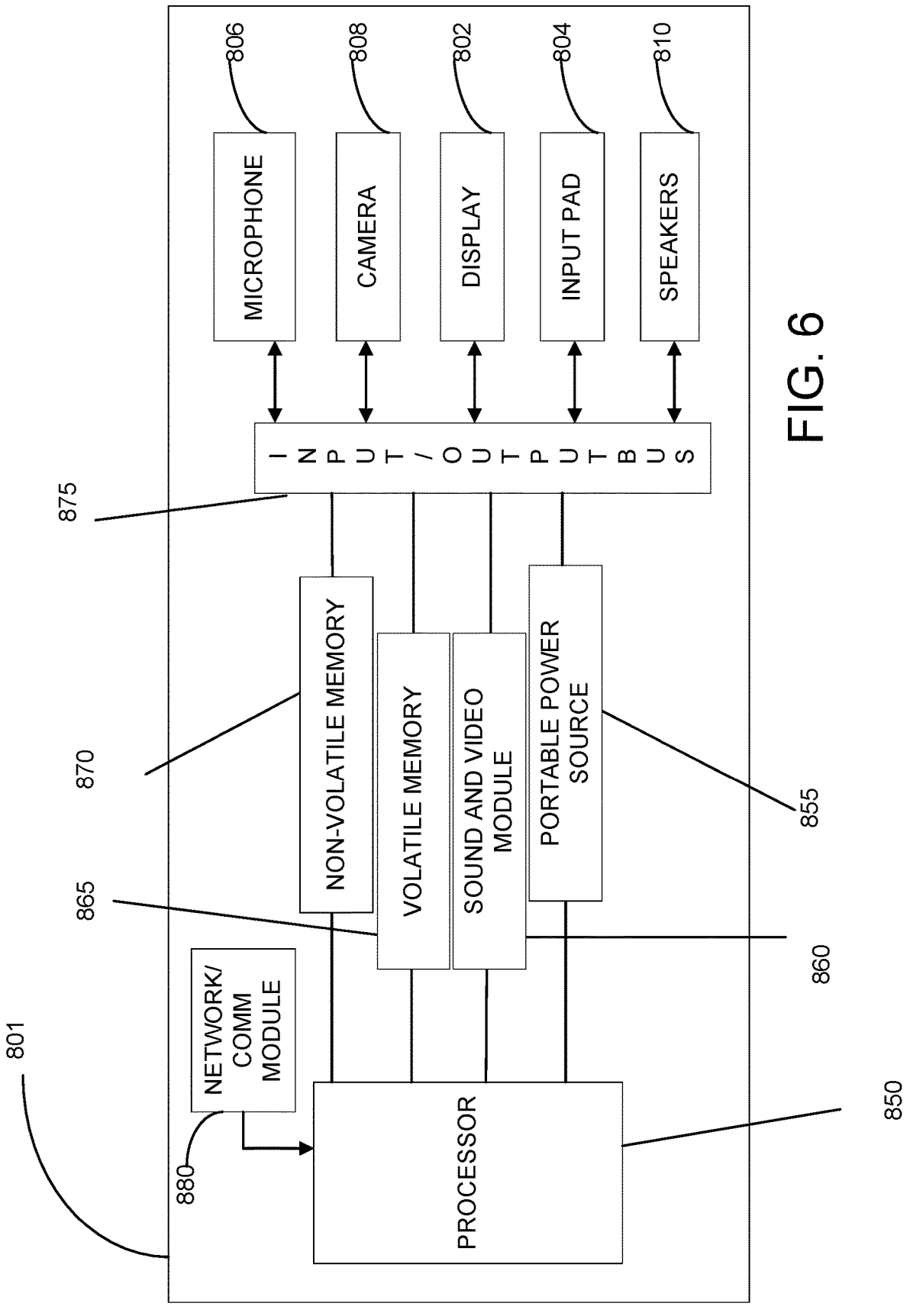
FIG. 6 is a diagram illustrating a portable computing device according to one embodiment.
Figure 7:
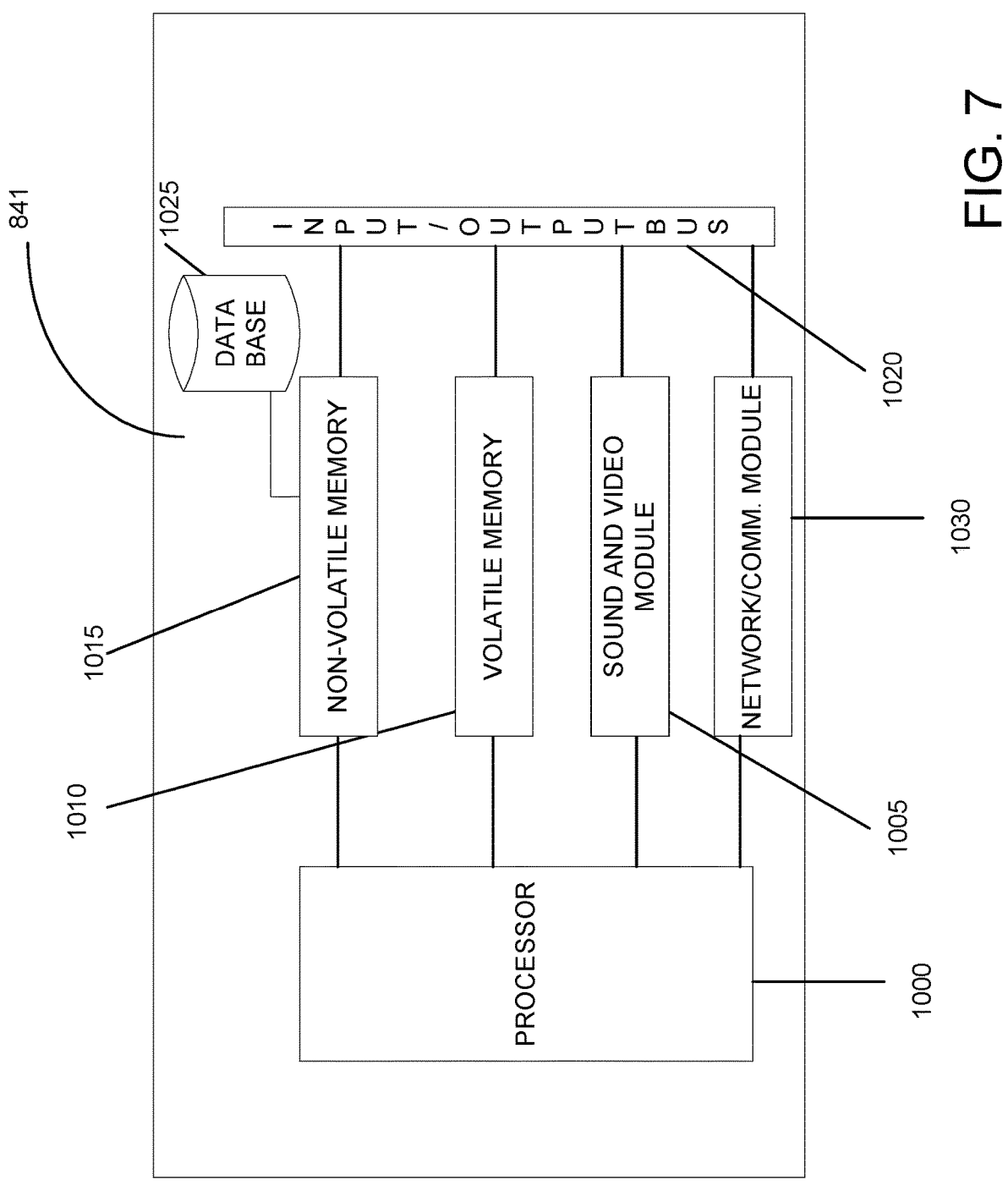
FIG. 7 is a diagram illustrating a computing device according to one embodiment.

FIG. 6 may be a high level illustration of a portable computing device 801 communicating with a remote computing device 841 in FIG. 7 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 6 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 7. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of lacking an ability to modify the timer configurations for triggering a CPG tone per client type and/or access type.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
identifying a call request from a first party to a second party;
generating a first tag identifying the first party based on a first client type;
generating a second tag identifying the second party based on a second client type, wherein at least one of the first client type or the second client type are identified from a list of client types including at least a voice over Long Term Evolution (VOLTE) device, an over-the-top (OTT) device, and a non-subscriber identifier module (SIM) device;
based on the identified first client type and the second client type, accessing a database for one or more timer configurations, wherein the one or more timer configurations correspond to the first client type or the second client type;
initiate a timer configuration based on accessing the database;
in response to an expiration of the timer configuration, identifying a configured response corresponding to the first client type or the second client type; and
providing an indicia to the first party as a function of the configured response.

2. The computer-implemented method of claim 1, further comprising establishing the first tag with an internet protocol multimedia subsystem (IMS).

3. The computer-implemented method of claim 1, further comprising generating a second tag identifying the first party based on an access type.

4. The computer-implemented method of claim 1, wherein the providing the indicia comprises providing the indicia as a visual or an audio alert from the second party.

5. The computer-implemented method of claim 1, wherein the at least one of the first client type or the second client type comprises an over-the-top (OTT) device.

6. The computer-implemented method of claim 1, wherein the at least one of the first client type or the second client type comprises a non-subscriber identifier module (SIM) device.

7. The computer-implemented method of claim 1, wherein at least one of the first tag or the second tag are stored in a tag structure.

8. The computer-implemented method of claim 1, wherein at least one of the first tag or the second tag are generated based on a registration access type.

9. The computer-implemented method of claim 8, wherein the registration access type includes at least one of WiFi 802.11, an UMTS Terrestrial Radio Access Network (UTRAN), or an Evolved Universal Terrestrial Radio Access Network (E-UTRAN).

10. The computer-implemented method of claim 1, wherein at least one of the first tag or the second tag are set by an authority, by the first party, by an algorithm, or by studying past calls.

11. A tangible, non-transitory computer-readable medium having computer-executable instructions stored thereon, wherein the computer-executable instructions is configured to be executed by a processor, computer-executable instructions comprising:
identifying a call request from a first party to a second party;

generating a first tag identifying the first party based on a first client type;
generating a second tag identifying the second party based on a second client type, wherein at least one of the first client type or the second client type are identified from a list of client types including at least a voice over Long Term Evolution (VOLTE) device, an over-the-top (OTT) device, and a non-subscriber identifier module (SIM) device;
based on the identified first client type and the second client type, accessing a database for one or more timer configurations, wherein the one or more timer configurations correspond to the first client type or the second client type;
initiate a timer configuration based on accessing the database;
in response to an expiration of the timer configuration, identifying a configured response corresponding to the first client type or the second client type; and
issuing an indicia to the first party as a function of the configured response.

12. The tangible, non-transitory computer-readable medium of claim 11, further comprising establishing the first tag with an internet protocol multimedia subsystem (IMS).

13. The tangible, non-transitory computer-readable medium of claim 11, further comprising generating a second tag identifying the first party based on an access type.

14. The tangible, non-transitory computer-readable medium of claim 11, wherein the providing the indicia comprises providing the indicia as a visual or an audio alert from the second party.

15. A system comprising:
a call originating device;
a call receiving device;
a network server is configured to identifying a call request from a call originating device to the call receiving device;
wherein the network server is configured to generate a first tag identifying the call originating device based on a first client type, wherein the network server is further configured to generate a second tag identifying the call receiving device based on a second client type, at least one of the first client type or the second client type being identified from a list of client types including at least a voice over Long Term Evolution (VOLTE) device, an over-the-top (OTT) device, and a non-subscriber identifier module (SIM) device;
based on the identified first client type and the second client type, wherein the network server is configured to access a database for one or more timer configurations, wherein the one or more timer configurations correspond to the first client type or the second client type;
wherein the network server is configured to initiate a timer configuration based on accessing the database;
in response to an expiration of the timer configuration, wherein the network server is configured to identify a configured response corresponding to the first client type or the second client type; and
wherein the network server is configured to provide an indicia to the call originating device as a function of the identified configured response.

16. The system of claim 15, further comprising wherein the network server is configured to establish the first tag with an internet protocol multimedia subsystem (IMS).

17. The system of claim 16, further comprising wherein the network server is configured to generate a second tag identifying the call originating device based on an access type.

18. The system of claim 17, wherein the IMS is configured to store a group of second tags.

19. The system of claim 16, wherein the IMS is configured to store a group of first tags.

20. The system of claim 15, wherein the indicia comprises a visual or an audio alert from the second party.

* * * * *